US010404917B2

(12) United States Patent
Wu et al.

(10) Patent No.: US 10,404,917 B2
(45) Date of Patent: *Sep. 3, 2019

(54) ONE-PASS VIDEO STABILIZATION

(71) Applicant: Futurewei Technologies, Inc., Plano, TX (US)

(72) Inventors: Zhenyu Wu, Plainsboro, NJ (US); Wei Jiang, Princeton, NJ (US); John Wus, Yardley, NJ (US); Hong Heather Yu, Princeton, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,603

(22) Filed: Oct. 13, 2017

(65) Prior Publication Data
US 2018/0041708 A1  Feb. 8, 2018

Related U.S. Application Data

(63) Continuation of application No. 14/642,469, filed on Mar. 9, 2015, now Pat. No. 9,854,168.
(Continued)

(51) Int. Cl.
*H04N 5/232* (2006.01)
*G06T 7/277* (2017.01)
*G06T 7/246* (2017.01)

(52) U.S. Cl.
CPC ......... *H04N 5/23267* (2013.01); *G06T 7/246* (2017.01); *G06T 7/277* (2017.01);
(Continued)

(58) Field of Classification Search
CPC . H04N 5/232; H04N 5/23267; H04N 5/23251
See application file for complete search history.

(56) References Cited

U.S. PATENT DOCUMENTS

2008/0240497 A1  10/2008  Porikli et al.
2009/0213234 A1* 8/2009  Chen .................. H04N 5/23248
348/208.4
(Continued)

OTHER PUBLICATIONS

Su, et al., "Global Motion Estimation From Coarsely Sampled Motion Vector Field and the Applications," IEEE Transactions on Circuits and Systems for Video Technology, vol. 15, No. 2, Feb. 2005, pp. 232-242.
(Continued)

*Primary Examiner* — Twyler L Haskins
*Assistant Examiner* — Fayez A Bhuiyan
(74) *Attorney, Agent, or Firm* — Conley Rose, P.C.

(57) ABSTRACT

A method of stabilizing a video in real time using a single pass including receiving consecutive video frames, where the consecutive video frames include a current video frame and previous video frames, storing the consecutive video frames in a buffer, estimating a global motion for the current video frame by describing a camera's relative motion between the current video frame and one of the previous video frames adjacent to the current video frame, estimating a long-term camera motion for the current video frame by determining a geometric mean of an accumulation of the estimate of the global motion for the current video frame and an estimate of global motion for each of the previous video frames, and displaying the current video frame on a display of an electronic device, the current video frame stabilized based on the estimate of the long-term camera motion.

20 Claims, 8 Drawing Sheets

Related U.S. Application Data

(60) Provisional application No. 61/949,909, filed on Mar. 7, 2014, provisional application No. 61/952,046, filed on Mar. 12, 2014.

(52) U.S. Cl.
CPC ............... *H04N 5/23251* (2013.01); *G06T 2207/10016* (2013.01); *G06T 2207/20016* (2013.01)

(56) References Cited

U.S. PATENT DOCUMENTS

| | | |
|---|---|---|
| 2013/0128063 A1 | 5/2013 | Jin et al. |
| 2015/0131731 A1 | 5/2015 | Kim et al. |
| 2017/0278219 A1* | 9/2017 | Yuan ................ H04N 21/44218 |

OTHER PUBLICATIONS

Matsushita, et al., "Full-Frame Video Stabilization with Motion Inpainting," IEEE Transactions on Pattern Analysis and Machine Intelligence, vol. 28, No. 7, Jul. 2006, pp. 1150-1163.

Hanning, et al., "Stabilizing Cell Phone Video using Inertial Measurement Sensors," IEEE International Workshop on Mobile Vision, 2011, 8 pages.

"Video Stabilization," Open Source Computer Vision 3.2.0, downloaded from the internet Dec. 23, 2016, 2 pages.

Grundmann, et al., "Auto-Directed Video Stabilization with Robust L1 Optimal Camera Paths," IEEE CVPR, 2011, pp. 225-232.

Liu, et al., "Subspace Video Stabilization," ACM Transactions on Graphics (presented at SIGGRAPH 2011). vol. 30, Issue 1, 2011, 10 pages.

"x264," VideoLAN Organization, www.videolan.org/developers/x264.html, 2013, 1 page.

Office Action dated Mar. 22, 2017, U.S. Appl. No. 14/642,469, filed Mar. 9, 2015, 13 pages.

Office Action dated Aug. 30, 2016, U.S. Appl. No. 14/642,469, filed Mar. 9, 2016, 12 pages.

Notice of Allowance dated Jul. 18, 2017, U.S. Appl. No. 14/642,469, filed Mar. 9, 2015, 14 pages.

"Series H: Audiovisual and Multimedia Systems Infrastructure of Audiovisual Services—Coding of Moving Video—Advanced Video Coding for Generic Audiovisual Services," International Telecommunication Union Telecommunication Standardization Sector of ITU, ITU-T Recommendation H.264, Feb. 2014, 2 pages.

\* cited by examiner

400

402
CAPTURE CONSECUTIVE ORIGINAL VIDEO FRAMES

404
ACCESS GLOBAL MOTION ESTIMATES

406
DETERMINE THE GEOMETRIC MEAN OF THE GLOBAL MOTION ESTIMATES

408
APPLY KALMAN FILTERING TO THE GEOMETRIC MEANS TO PRODUCE SMOOTHED VERSIONS OF THE GEOMETRIC MEANS

410
ADJUST PARAMETERS OF THE KALMAN FILTERING

412
MULTIPLY THE SMOOTHED VERSIONS OF THE GEOMETRIC MEANS TO DETERMINE TRANSFORMATION MATRICES

414
MODIFY COEFFICIENTS OF THE TRANSFORMATION MATRICES TO MITIGATE DRIFTING EFFECT

416
APPLY TRANSFORMATION MATRICES TO WARP THE VIDEO FRAMES

Fig. 4

ONE-PASS VIDEO STABILIZATION

CROSS-REFERENCE TO RELATED APPLICATIONS

This patent application is a continuation of co-pending U.S. patent application Ser. No. 14/642,469, entitled "One-Pass Video Stabilization," filed Mar. 9, 2015, which claims priority to U.S. Provisional Application No. 61/949,909, entitled "One-Pass Video Stabilization by Hybrid Model Localized Path Planning," filed on Mar. 7, 2014, and to U.S. Provisional Application No. 61/952,046, entitled "One-Pass, Low-Complexity Software-Based Video Stabilization Method," filed on Mar. 12, 2014, which are hereby incorporated by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

With the widespread prevalence of mobile devices, mobile video capture has become an inseparable part of everyday lives. For many users, it is hard to hold a mobile camera steady, and consequently the captured videos are usually shaky. Thus, there is a need for robust real-time video stabilizers on mobile devices.

Conventional video stabilizers can be characterized as hardware-assisted software-based approaches, and purely software-based approaches.

Hardware-assisted software-based approaches rely on knowledge about the mobile device's camera (camera priors). For example, information about the camera's dependent inter-frame delay, the intrinsic camera matrix, and the calibrated inertial sensors may be needed. However, due to gyroscopic drift and sensor noises, camera translations computed from the mobile device's inertial sensors are prone to error, while the assumption of pure camera rotation is unrealistic for videos such as videos of non-planar scenes. In addition, the requirement of dedicated calibration is impractical for some users.

Without knowledge or assumptions of camera priors, purely software-based approaches post-process a video in three main steps: (1) global motion estimation (GME), (2) camera path optimization, and (3) frame synthesis. In GME, the parametric camera motion between consecutive frames is estimated based on visual appearance. Camera path optimization is responsible for removing unwanted vibration in camera motion while preserving intentional camera movement; an optimal intended smooth camera trajectory is estimated and high-frequency fluctuations are removed. In frame synthesis, a stabilized video is synthesized by warping the original frames based on the estimated smooth trajectory. Earlier work applied low-pass filters to remove high-frequency motion. Recently, an L1-norm optimization has been used to generate a camera path that follows cinematography rules.

There are applications, such as video conferencing and video surveillance, in which it is preferable for the video sequence to be stabilized during capture instead of post-processing it after capture. If the video stabilizer is supposed to show the processed video on-the-fly, then the camera path optimization has to be done in a streaming manner. That is, the optimizer scans each input video frame only once, which may be referred to as "one-pass" processing.

There are a number of difficulties associated with camera path optimization in video stabilization, and one-pass optimization in particular. First, the output of GME is often noisy due to factors including occlusion or the lack of feature points, etc., in the input video. Such noises can affect the estimation of camera intentional motion, and thus impact the stabilization performance. Second, a one-pass camera path optimizer only has access to a local window of video frames at a time, and it can only scan each frame once. Thus, compared to a multi-pass version, a one-pass optimizer does not have the global level information about the entire camera motion trajectory and therefore has to rely on limited information about local motion to estimate intentional camera motion. Third, one-pass optimization is often required for real-time applications running on mobile hardware platforms, where complexity and memory issues prevent the use of effective but complicated algorithms in video stabilization.

Conventional software-based approaches generally do not perform satisfactorily to stabilize videos in real time. Except for motion filtering methods, conventional camera path planning approaches need to have the whole camera trajectory estimated and therefore rely on two-pass processing. Second, in many cases, robust feature tracks cannot be obtained due to rapid camera motion, occlusions, etc. High-quality feature matching such as those relying on SIFT/SURF (scale invariant feature transform/speeded up robust features) matching are not realistic for mobile devices because of the devices' limited memory and computational power. For the same reason, methods that rely on extra motion editing (e.g., inpainting) or expensive optimization are not suitable for real-time processing of videos, particularly high definition videos. Third, conventional real-time motion filtering methods utilize scene-dependent parameter tuning. For example, aggressive filtering provides a more stabilized camera path but larger out-of-bound areas, while mild filtering provides less stabilization but a larger output. Many users do not have the knowledge or interest in such parameter tuning, and would prefer automatic settings that produce the highest quality for stabilization.

SUMMARY

In an embodiment, the disclosure includes a device configured to provide one-pass, real-time video stabilization. The device includes a memory including a buffer and instructions, and a processor coupled to the memory, the processor configured to execute the instructions stored in the memory to cause the processor to store consecutive video frames in the buffer of the memory after receipt, the consecutive video frames including a current video frame and previous video frames, estimate a global motion for the current video frame by describing a camera's relative motion between the current video frame and one of the previous video frames adjacent to the current video frame, estimate a long-term camera motion for the current video frame by determining a geometric mean of an accumulation of the estimated global motion for the current video frame and an estimate of global motion for each of the previous video frames, and stabilize the current video frame based on the estimated long-term camera motion, and a display device coupled to the processor, the display device configured to display the current video frame as stabilized.

In an embodiment, the disclosure includes a method of stabilizing a video in real time using a single pass including receiving consecutive video frames, the consecutive video frames including a current video frame and previous video frames, storing the consecutive video frames in a buffer, estimating a global motion for the current video frame by describing a camera's relative motion between the current video frame and one of the previous video frames adjacent to the current video frame, estimating a long-term camera motion for the current video frame by determining a geometric mean of an accumulation of the estimated global motion for the current video frame and an estimate of global motion for each of the previous video frames, and displaying the current video frame on a display of an electronic device, the current video frame stabilized based on the estimated long-term camera motion.

In an embodiment, the disclosure includes a computer program product comprising computer executable instructions stored on a non-transitory medium that when executed by a processor cause a one-pass, real-time video stabilization device to receive consecutive video frames, the consecutive video frames including a current video frame and previous video frames, store the consecutive video frames in a buffer, estimate a global motion for the current video frame by describing a camera's relative motion between the current video frame and one of the previous video frames adjacent to the current video frame, estimate a long-term camera motion for the current video frame by determining a geometric mean of an accumulation of the estimated global motion for the current video frame and an estimate of global motion for each of the previous video frames, and display the current video frame on a display of an electronic device, the current video frame stabilized based on the estimated long-term camera motion.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a flowchart of an example of a computer-implemented method for video stabilization in embodiments according to the present disclosure.

DETAILED DESCRIPTION

Figure 1:
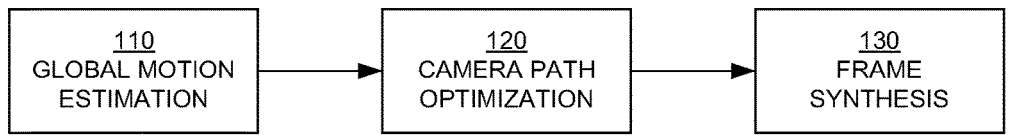
FIG. 1 is a block diagram illustrating modules in an architecture of a software video stabilizer in embodiments according to the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "maintaining," "computing," "performing," "synthesizing," "extracting," "using", "determining," "testing," "buffering," "adjusting," "applying," "accessing," "multiplying," "modifying," "generating," "identifying,"

"dividing," "deriving," "detecting," or the like, refer to actions and processes (e.g., the operations of the flowcharts 400, 900, 1000, and 1100 of FIGS. 4 and 9-11, respectively) of a computer system or device (e.g., a smartphone or tablet, such as the device 1200 of FIG. 12) or a similar device or processor. A computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Embodiments according to the present invention pertain to one-pass real-time video stabilization on mobile devices, such as but not limited to smartphones, tablets, and wearable devices such as glasses and watches.

In an embodiment, operations to stabilize a video include buffering consecutive original video frames captured using a camera, determining transformation matrices from subsets of the original video frames, where the transformation matrices represent estimates of stable camera motion, using the transformation matrices to warp the original video frames and generate stabilized video, and adjusting sizes of the subsets depending on one or more conditions.

In one or more embodiments, global motion estimates that describe the camera's relative motion between two consecutive video frames are accessed. The geometric mean of the global motion estimates for each of the subsets is determined. Kalman filtering is applied to the geometric mean for each of the subsets to produce smoothed versions of the geometric means. Parameters of the Kalman filtering are adjusted according to an indicator of reliability of the global motion estimates. The smoothed versions of the geometric means are multiplied to determine the transformation matrices. Coefficients of the transformation matrices are modified to mitigate a drifting effect introduced by multiplying the smoothed geometric means.

In one or more embodiments, a first transformation matrix for a first subset of the subsets is generated using a first motion model. The first motion model is selected from a plurality of motion models including a homography model with eight degrees-of-freedom, an affine transformation model with five degrees-of-freedom, and a similarity transformation model with four degrees-of-freedom. Inter-frame transformation matrices between pairs of consecutive frames in the first subset are determined. Corrective transformation matrices that change the inter-frame transformation matrices to match the first transformation matrix are derived. The corrective transformation matrices are applied to the original video frames in the first subset to determine a first set of warped video frames. A determination is made as to whether the first set of warped video frames satisfies one or more conditions. The conditions include a constraint for out-of-bound area size and a constraint for amount of skewness of a warped video frame. If the first set of warped video frames satisfies the condition(s), then a second transformation matrix for a second subset of the subsets is generated using the first motion model; however, if the first set of warped video frames does not satisfy the condition(s), then a determination is made as to whether the first subset can be divided into smaller subsets. If the first subset can be divided into smaller subsets, then it is divided into a second subset and a third subset, second and third transformation matrices are generated for the second and third subsets, respectively, using the first motion model, and the second and third transformation matrices are used to determine sets of warped video frames from original video frames in the second and third subsets, respectively. If, on the other hand, the first subset cannot be divided into smaller subsets, then a second (e.g., less complex) motion model is selected, a second transformation matrix for the first subset is generated using the second motion model, and the second transformation matrix is used to determine the first set of warped video frames.

Embodiments according to the present disclosure provide online processing capability and better overall performance. Video stabilization is improved and artifacts are reduced. Visually pleasant videos can be produced in real time according to cinematographic rules. The disclosed video stabilization methodologies can be implemented on mobile devices, such as smartphones, for example, without the user necessarily having to perform scene-dependent parameter tuning.

One-Pass Video Stabilization—Kalman Filtering with Local Motion Adaptation

Embodiments about to be described pertain, in general, to a method for performing one-pass camera path optimization for software video stabilization. In these embodiments, Kalman filtering is employed to estimate the long-term (intentional) camera path (e.g., due to panning, zooming, etc.), on-the-fly, from noisy global motion estimates based on a sliding observation window over incoming video frames. Furthermore, a metric is derived during global motion estimation (GME) to evaluate the reliability of each estimated global motion, and then is used in Kalman filtering to adjust the weight between an a priori estimate and a measurement update. This practice can make the path optimizer more robust to motion estimation errors and noises and help reduce the complexity of GME in video stabilization.

FIG. 1 is a block diagram illustrating modules in an architecture 100 of a software video stabilizer in an embodiment according to the present invention. In the FIG. 1 embodiment, a camera path optimization module 120 takes a series of global motion estimates $\{M_i\}$ as input from a GME module 110. Each global motion estimate $M_i$ takes the form of a 3×3 transformation matrix and describes a camera's relative motion between frame i and frame i+1. Additionally, each $\{M_i\}$ contains unwanted camera vibration and can be noisy. The output of the path optimization module 120 is a smoothed camera path $\{\tilde{M}_i\}$, which is used by the following frame synthesis module 130 to spatially realign frames.

Figure 2:
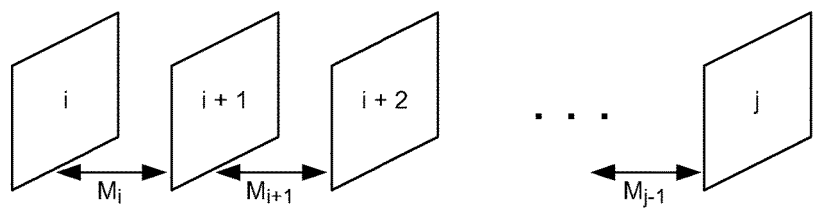
FIG. 2 illustrates a sliding observation window that includes video frames captured by a camera in embodiments according to the present disclosure.

To realize online video stabilization, a sliding observation window is set up to estimate local long-term camera motion, as shown in FIG. 2. In FIG. 2, a set of consecutive frames are stored in a window buffer. If the current frame in the video stabilization process is frame i, then the buffered frames in the window can come from frames that are either temporally before ("look-ahead" window) or temporally after ("look-back" window) frame i.

Long-term (intentional) camera motion can be estimated by averaging out random camera vibration within the observation window. The window size can be adjusted to accommodate camera shakiness with different frequencies. Rotation radian values are generally small and so, in an embodiment, the window size is set to a power of two (e.g., eight, 16, or 64 frames), which simplifies the averaging calculation. Accuracy is improved with a larger window size.

As unwanted (unintentional) camera vibration is generally short-term and random, it tends to be cancelled out when the average is done over a long-enough duration. The size of the observation window can be adjusted to cope with vibrations at different frequencies. For example, to remove some low-frequency vibration, the window size can be increased accordingly so that the average is determined over a longer period of time. On the other hand, for relatively high-frequency intentional camera motion, the window size can be reduced to preserve that motion. One strategy is to use input from a sensor on the device (such as a gyro) to help automatically determine the window size. For example, if the sensor indicates that the device/camera is being moved at a relatively constant speed (e.g., intentional camera motion, such as panning or zooming), then the window size can be reduced; and if the sensor indicates a movement characteristic of unintentional camera motion (e.g., a sudden movement), then the window size can be increased. Other strategies for adjusting window size include adjusting the size in response to an input from a user or using information indicating how the camera is being used (e.g., knowledge of the use scenario: the way the camera is being used, or the type of events being captured).

The average motion associated with frame i can be calculated as the geometric mean of the accumulated motions within each observation window:

$$\overline{M}_i = \sqrt[L]{\prod_{i=1}^{L} M_i} \qquad \text{Eq. (1)}$$

where L is the size of the window. $\tilde{M}_i$ can be regarded as the estimate of the long-term (stable) camera motion that occurred during the observation window associated with frame i.

As the sliding observation window is moved over the input video frames, a series of locally estimated long-term camera motions are produced. However, due to the uncertain nature of the camera vibration, there may be a residual random motion component in the estimate. Inaccurate GME output due to occlusions, lack of feature points, etc., can also add ambiguity to the estimate. Also, intentional camera motion can change over time, so a local observation window may not perfectly capture the camera's long-time motion all the time.

Kalman filtering is used in the present embodiments to mitigate such uncertainties and produce more accurate intentional camera motion estimates. A Kalman filter consists of "predict" and "correct" stages. In the predict stage, the filter projects estimation statistics from past-filtered samples to obtain an a priori estimate for the current sample of frames: the state ahead is projected, and the error covariance ahead is projected. The a priori estimate effectively reduces noises from GME.

In the correct stage of the Kalman filter, the measurement of the current sample is taken into account to obtain an improved a posteriori estimate: the Kalman gain is computed, the projected state is updated, and the error covariance is updated. The filter's parameters also get updated to propagate the estimation statistics to future samples. Because of the filter's recursive structure, these stages can be implemented in an online processing manner and without storing any sample data.

In the present embodiments, Kalman filtering is applied to filter each coefficient individually in the transformation matrices $\{\overline{M}_i\}$ to produce the smoothed version $\{\tilde{M}_i\}$. For a chosen motion model, each coefficient in $\overline{M}_i$ corresponds to a model coefficient. As noted above, Kalman filtering helps by predicting an a priori estimate based on past filtered model coefficients to effectively reduce the impact from residual random motion and GME noises contained in $\{\overline{M}_i\}$, and by incorporating the current $\overline{M}_i$ measurement into an a posteriori estimation of $\tilde{M}_i$ to adapt to changes in any underlying intentional camera motion.

In Kalman filtering, a pair of parameters Q (process noise covariance) and R (measurement noise covariance) controls the relative weight between the a priori estimate and the measurement value in the a posteriori estimation. Ideally, when there is less confidence about the current global motion estimate $M_i$, the Kalman filter will reduce the weight of the measurement value $\overline{M}_i$ to rely more on the past filtered samples (the a priori estimate) when estimating $\tilde{M}_i$. In the present embodiments, this is achieved as follows. In the GME module, after matching of blocks or feature points between two consecutive video frames is performed, a list of matched coordinates are fed into the RANSAC (Random Sample Consensus) procedure to calculate model coefficients by minimizing RMSE (root mean square error). In that step, a number of coordinates may be rejected as outliers due to excessive errors. The ratio between the number of remaining inliers and the total number of coordinates samples serves as a good indicator of the reliability of the derived global motion model; for example, a higher percentage of inliers indicates a more reliable estimate, and vice versa. In an embodiment, this ratio is presented as a variable r in a heuristic equation to determine the relative weight between Q and R. In one such embodiment, Q is to be a constant and R is adjusted according to:

$$R=(1-r)^3 \times 0.025 \qquad \text{Eq. (2)}$$

As just noted, Eq. (2) is heuristic and, in an embodiment, is constrained such that a monotonically decreasing relationship between R and r is maintained. A consequence of maintaining control over the measurement weight is that the path optimizer can be more tolerant to GME noises. That in turn can help reduce the complexity of the GME module 110 (FIG. 1), which is often the most complicated piece and the bottleneck in real time video stabilization.

In the Kalman filtering process, each estimated coefficient of the motion model is configured to be constant. As each filtered transformation matrix $\tilde{M}_i$ represents the relative global motion between two consecutive frames i and i+1, that means the estimated intentional camera trajectory is modeled to be comprised of piecewise constant-speed (stable) motion, where constant speed includes zero motion. This conforms to cinematography rules so that the stabilized video is more pleasant to viewers.

After obtaining the intentional camera motion estimates $\{\tilde{M}_i\}$, the camera path optimization module 120 (FIG. 1) forms $\{\hat{M}_i\}$ and uses it to warp the frame i. A straightforward way to achieve this is to calculate the accumulated motion model $\hat{M}_i$ for frame i as:

$$\hat{M}_i = \vee_{j=1}^{i} \tilde{M}_j. \qquad \text{Eq. (3)}$$

Figures 3A, 3B:
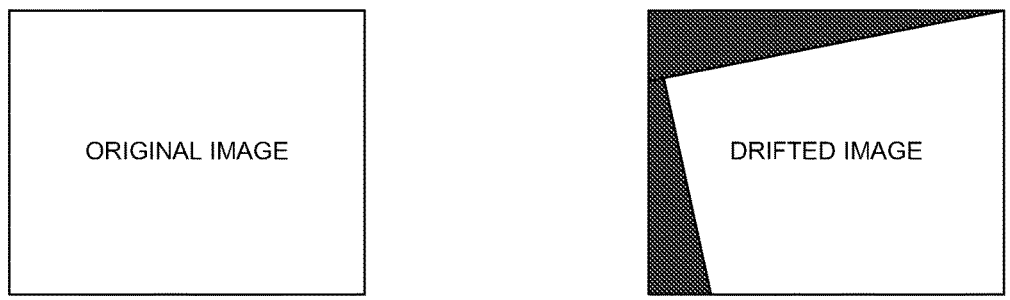
FIGS. 3A and 3B illustrate an example of a drifting effect between two video frames, which is corrected in embodiments according to the present disclosure.

However, that can lead to a "drifting" effect when the camera has a consistent and perhaps intentional motion, such as panning, as shown in FIGS. 3A and 3B. In the present embodiments, a parameter F that may be referred to herein as a "forgetting factor" ($0 \leq F \leq 1$) is introduced to mitigate the drifting effect. Specifically, in an embodiment, each model coefficient c from $\hat{M}_i$ is updated to be $c=(1-F)c$ before warping the frame i. Therefore, a larger value of F counters a greater drifting effect but may reduce the stabilizing power, and a smaller value of F can produce a more stabilized result but may lose spatial resolution due to the drifting effect. The value of F can be left to the users to decide depending on their preferences.

FIG. 4 is a flowchart 400 of an example of a computer-implemented method for video stabilization in embodiments according to the present disclosure. The operations of the flowchart 400 can be implemented by the device 1200 of FIG. 12. For example, the operations of the flowchart 400 can be implemented as computer-executable instructions residing on some form of non-transitory computer-readable storage medium (e.g., the memory 1204 of FIG. 12) and executed by a processor (e.g., the processor 1202 of FIG. 12).

In block 402 of FIG. 4, consecutive original video frames that are captured using a camera are buffered.

In block 404, global motion estimates $\{M_i\}$ that describe the camera's relative motion between two consecutive video frames are accessed.

In block 406, the geometric mean $\overline{M}_i$ of the global motion estimates for each of the subsets is determined (Eq. (1)).

In block 408, Kalman filtering is applied to the geometric mean for each of the subsets to produce smoothed versions of the geometric means $\{\tilde{M}_i\}$.

In block 410, parameters (Q and R) of the Kalman filtering are adjusted according to an indicator of reliability of the global motion estimates.

In block 412, the smoothed versions of the geometric means are multiplied (Eq. (3)) to determine the transformation matrices (the accumulated motion model $\hat{M}_i$).

In block 414, coefficients of the transformation matrices are modified (e.g., by a forgetting factor F) to mitigate a drifting effect introduced by multiplying the smoothed geometric means.

In block 416, the transformation matrices $\{\hat{M}_i\}$ are used to warp the frames.

One-Pass Video Stabilization—Hybrid Model Localized Path Planning

In embodiments about to be described, a hybrid auto-corrective path planning approach that uses different models addresses artifacts caused by feature tracking due to rapid camera motion, occlusions, etc., and caused by scene-dependent parameter tuning. Motion models are adaptively switched according to the actual video.

The local camera path planning framework (FIG. 5) can generate an optimized, visually pleasant camera trajectory according to cinematographic rules. The hybrid model stabilization approach can significantly improve stabilization results and reduce artifacts. Auto-corrective motion model switching can adaptively select and use the best of the motion models according to the actual videos, which further helps reduce artifacts. The overall framework can be implemented on smartphones, tablets, etc., without parameter tuning, calibration, or other hardware support. Stabilization quality is improved, and computational cost is reduced.

Figure 5:
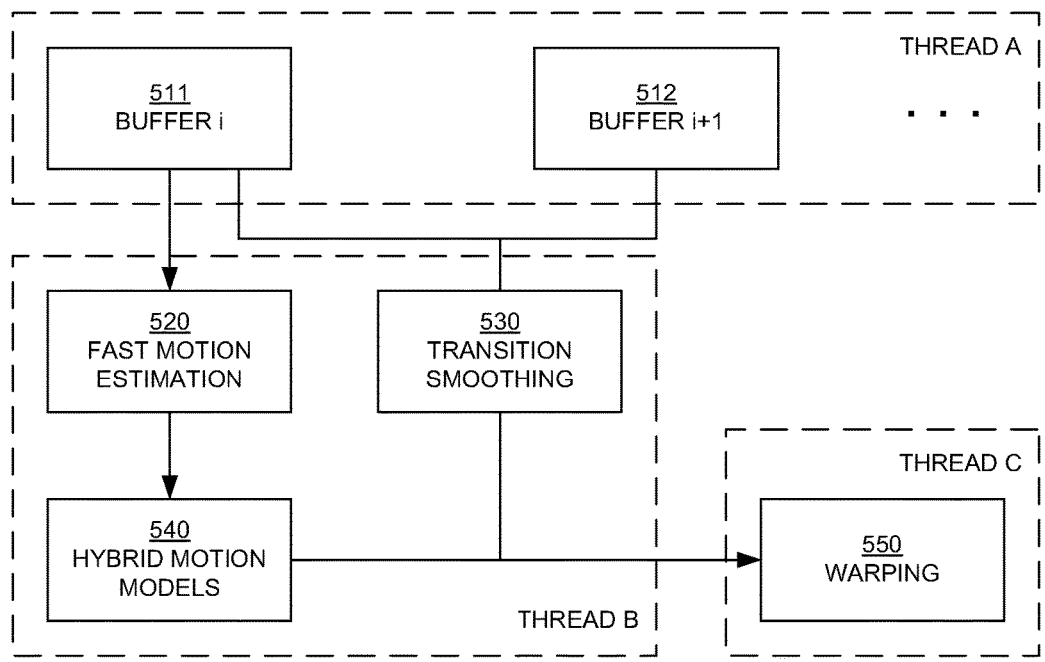
FIG. 5 is a diagram illustrating overall workflow in embodiments according to the present disclosure.

FIG. 5 is a diagram illustrating overall workflow in a path planning framework in embodiments according to the present disclosure. In an embodiment, the path planning framework is implemented in the camera path optimization module 120 of FIG. 1.

With reference to FIG. 5, the video capture thread A maintains backward-looking buffers 511 and 512 during the normal video capture, where an L-length video sequence is stored in the buffer. In addition, a forward-looking buffer could be utilized. Use of only a backward-looking buffer eliminates a potential source of delay in the overall system output of the stabilized video.

The camera path planning thread B estimates the short-term camera trajectory over the buffered video sequence (block 520) and computes the smooth camera trajectory for stabilization (block 530). In an embodiment, a tree-splitting based approach is used, where hybrid motion models (block 540) are used for improved stabilization according to cinematographic rules.

To accommodate the large variety of video content and camera motion where it can be difficult to obtain satisfactory long feature tracks, and to reduce computational costs for real-time mobile applications, short-term fast feature tracking is used to obtain correspondences between consecutive video frames. In other words, keypoint correspondences are tracked during a short period of time, e.g., in two consecutive frames, using fast tracking methods. In an embodiment, the very fast binary ORB (Oriented FAST [FIX Adapted for Streaming] and Rotation BRIEF [Binary Robust Independent Elementary Features]) keypoints are computed over each frame, which is approximately 20 times faster than computing SURF keypoints and 400 times faster than computing SIFT keypoints over an 1920×1080 HD (high definition) video.

To reduce the number of detected local points for robust and fast tracking, a grid-based mechanism can be used. In an embodiment, an image grid (e.g., 16×16) is used to spread the detected feature points into different cells, and the strongest feature point having the highest response value is selected for each cell. This allows for more robust motion estimation with lower complexity by reducing the number of feature points needed.

After feature point determination, feature point correspondences are determined between adjacent video frames in order to calculate inter-frame motion. A Kanade-Lucas-Tomasi (KLT) tracker is one example of an effective method to determine the feature point correspondences. Based on these correspondences, the inter-frame motion transformation matrices (e.g., homography, affine, or similarity transformation matrices) can be robustly estimated by using, for example, RANSAC and outlier feature rejection techniques.

In the frame synthesis thread C of FIG. 5, a set of corrective transformation matrices can be directly used to warp the original frames into stabilized frames (block 550), which can then be displayed.

Figure 6:
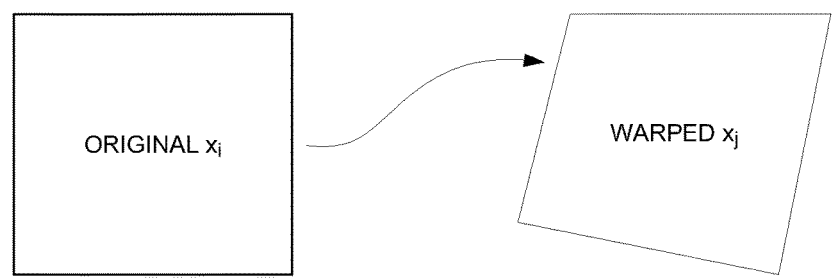
FIG. 6 illustrates an example of warping a video frame in embodiments according to the present disclosure.

Consider a two-dimensional (2D) image point $[u_i, v_i]^T$ in an image $x_i$ and a 2D image point $[u_j, v_j]^T$ in another image $x_j$. A three-by-three (3×3) homography H is generally used to relate the pixel coordinates as:

$$[U_j, V_j, 1]^T \sim H[U_i, V_i, 1]^T;$$

where "~" means equal up to a scale, and therefore H has eight (8) degrees-of-freedom (8-DOF). When applied to every pixel, and with reference to FIG. 6, the image xj as a warped version of the image xi is obtained:

$$\begin{bmatrix} x_j \\ y_j \\ 1 \end{bmatrix} = H_{3\times 3} \begin{bmatrix} x_i \\ y_i \\ 1 \end{bmatrix}.$$ Eq. (4)

Assuming linear projectivity, the 8-DOF homography can be reduced to a 5-DOF affine transformation T. Assuming single rotation and isotropic scaling, the affine transformation T can be further reduced to a 4-DOF similarity transformation S. In general, models with higher DOFs are more descriptive and are more powerful for stabilization. However, higher order models are more sensitive to errors in feature tracking and motion estimation, and can generate more severe artifacts when such errors occur. In embodiments according to the present disclosure, a hybrid approach is used, in which the methodology automatically switches among 8-DOF homography, 5-DOF affine transformation, and 4-DOF similarity transformation, to adaptively improve stabilization results and reduce artifacts according to the actual video. In an embodiment, the mechanism for automatically determining an appropriate motion model includes an approach of gradually reducing the degree of freedom of the motion model based on a robustness test. Additional information is provided below.

From a cinematographic standpoint, pleasant viewing experiences are realized through the use of static cameras (e.g., a constant camera path), panning cameras mounted on tripods, or cameras placed onto a dolly (e.g., a camera path of constant velocity). Let W denote a 2D transformation matrix (W can be a homography H, affine transformation T, or similarity transformation S). The above cinematographic characteristics can be described as a camera path with a constant transformation W, where a static camera can be represented by an identity matrix W.

From fast feature tracking and motion estimation, a set of inter-frame transformation matrices $\{W^{i,i+1}\}$ can be obtained over the buffered L-length video sequence:

$$x_{i+1} = W^{i,i+1} x_i$$ EQ. (5)

Based on cinematographic rules, a target video sequence that is stable, or as stable as possible, is desirable. Also, it is desirable to maintain a reasonable field of view and avoid excessive skew and perspective artifacts. To achieve these goals, embodiments according to the present disclosure determine a piecewise, constant-speed stable camera path over the buffered L-length video sequence, where constant speed also includes zero velocity. In an embodiment, the piecewise stable segments are determined using a tree-splitting method subject to a constraint for the out-of-bound area size and also subject to bounds on the skewness of the warped frame. The tree-splitting method is described further below.

The optimal constant transformation matrix $W_c$ can be estimated over a stable l-length piece or segment of camera path (1≤L) by optimizing the following cost function:

$$\min \Sigma_{i=1}^l \|x_{i+1} - W_c x_i\|^2.$$ EQ. (6)

Let $y_i$ denote the target warped frame of an original frame $x_i$; $y_i$ will follow the optimized camera path:

$$y_{i+1} = W_c y_i.$$ Eq. (7)

Figure 7:
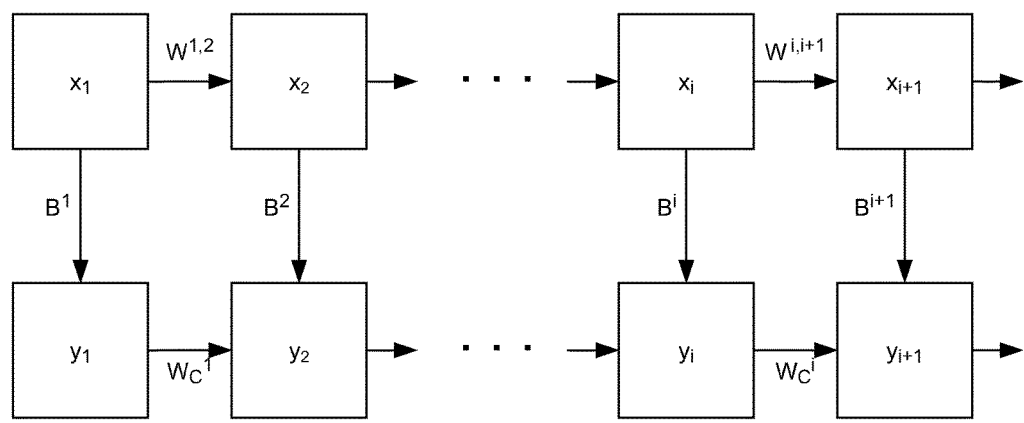
FIG. 7 illustrates an example of the use of corrective transformation matrices to warp video frames in embodiments according to the present disclosure.

With reference to FIG. 7, a transformation matrix $B^i$ that corrects the original transformation matrix $W^{i,i+1}$ (from Eq. (5)) to the optimized transformation matrix $W_c$ (from Eq. (6)) can be computed. The transformation matrix $B^i$ is computed by: transforming the feature points of the current frame i by the original transformation $W^{i,i+1}$, resulting in transformed feature points $P^i$; transforming the feature points of the current frame i by the optimized transformation $W_c$, resulting in transformed feature points $P^i_c$; and computing $B^i$ to align $P^i$ with $P^i_c$. $B^i$ can be computed using the same method used to compute original $W^{i,i+1}$, with the difference being that while $W^{i,i+1}$ is computed using the original matching feature points from frames i and i+1, $B^i$ is computed using the matching feature points $P^i$ with $P^i_c$. The corrective transformation matrix $B^i$ can warp the original frame $x_i$ to generate the target frame $y_i$. The set of corrective transformation matrices $\{B^i\}$ can be directly used to warp the original frames into stabilized frames.

Figure 8:
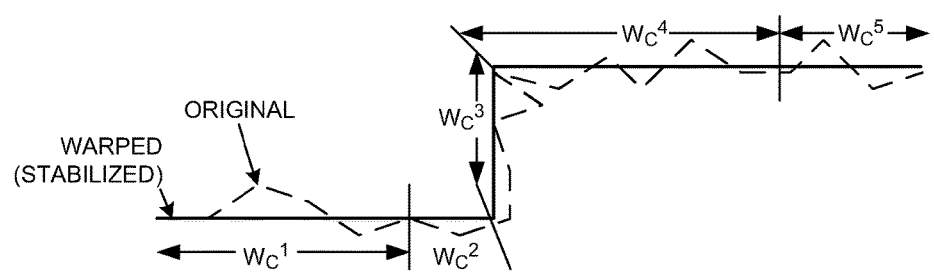
FIG. 8 illustrates an example of a smoothed camera trajectory path in embodiments according to the present disclosure.

The process just described can be repeated to provide a stabilized camera path consisting of a series of stable segments as shown in FIG. 8.

Then, given two segments of stable camera trajectory, a transition transformation $W_t$ can be computed to smooth their transition. In an embodiment, the frames at the boundary of the two connecting segments are treated as a stable sub-segment, and feature correspondences of these frames are aggregated to compute another transformation matrix around the transition area, which is used to rectify the transition frames. Such a methodology keeps some level of transition inconsistency as a tradeoff to avoid severe artifacts and to provide a larger field of view. In an alternative implementation, one-pass real-time video stabilization can be performed by applying low-pass filters over local camera trajectories, in combination with video-dependent parameter tuning. The methodology can be enhanced to balance misalignment artifacts, balance the field-of-view size, and balance the motion inconsistency in the transition areas by, for example, automatically adjusting the position and length of the transition boundary.

To divide the original L-length camera path into piecewise stable segments, a fast tree-splitting method can be used to provide low-complexity processing in real time. To avoid severe skew and perspective artifacts, relatively tight bounds can be placed on the skewness of the warped frames. In an embodiment, the four corners of a warped frame are not allowed to deviate from the corresponding corners of the previous warped frame by more than five percent. Also, the size of the accumulated out-of-bound area over a stable segment of camera path is checked. In an embodiment, the compensated frames are set to preserve 80% of the original field of view. If these two constraints are violated, then the corresponding segment of the camera path is split in half, and the optimized stable camera path is recomputed over each half respectively. The camera path segments can be recursively split in half until one of these stop criteria is met: either all segments of the camera path comply with the two constraints, or there are too few frames (e.g., less than a preset number) in an unsatisfactory segment to further split it.

When the tree-splitting path process stops, if unsatisfactory segments still exist, then that indicates large artifacts exist in the warped frames using the currently selected motion model. The artifacts may be caused by feature tracking failures due to abrupt large object/camera motion or the lack of robust features. In such a case, the motion model is reduced and a lower-DOF transformation is used instead. That is, the tree-splitting path planning described above is re-performed using a lower-DOF transformation as W. Such a process can be repeated as the system gradually reduces the motion models until all camera pieces satisfy the criteria. If unsatisfactory segments still exist using the lowest-DOF motion model, then it indicates that large artifacts exist no matter which motion model is used. To avoid unpleasant artifacts, the corresponding frames in such portions of the video may not be processed; e.g., the original frames are preserved and the system gracefully degrades over such frames.

Figure 9:
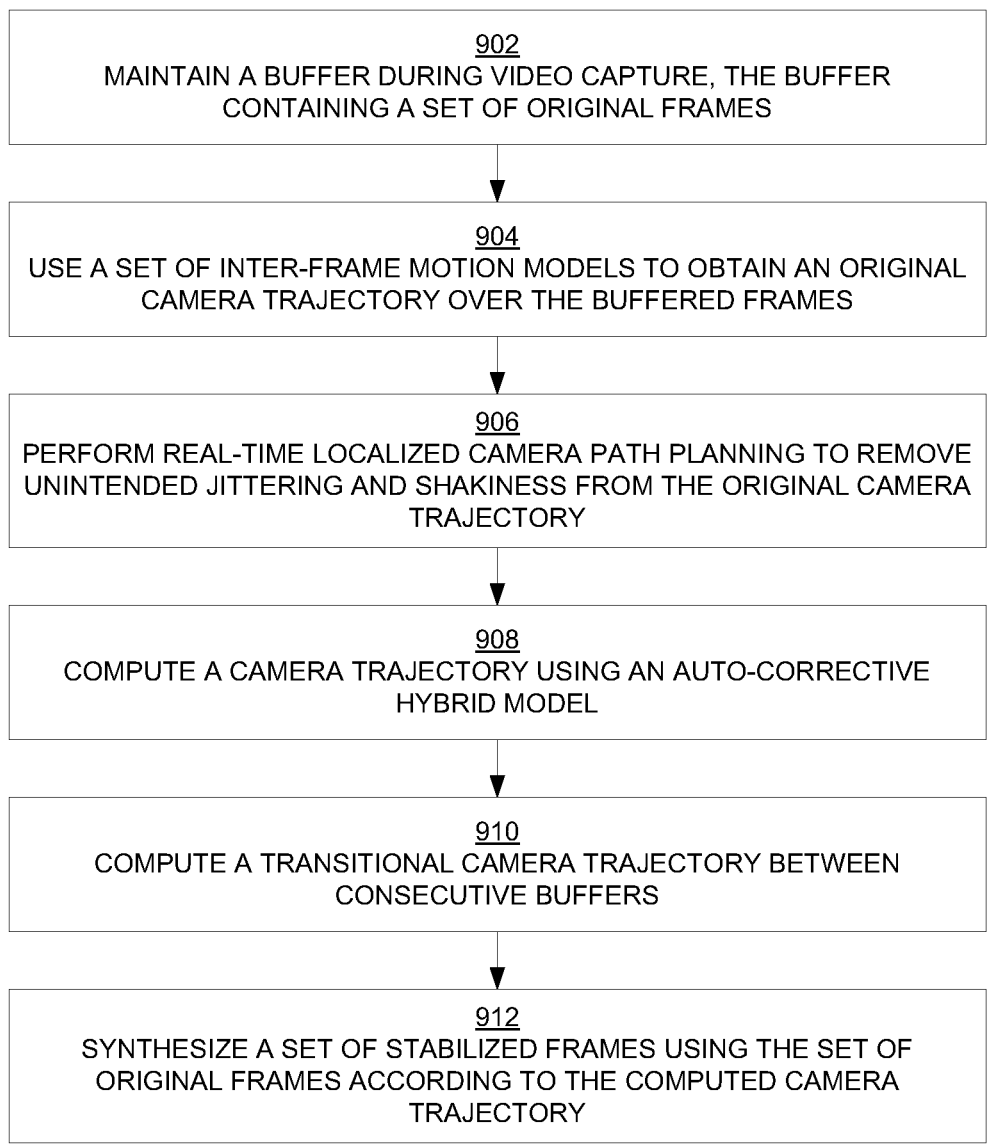
FIG. 9 is a flowchart of an example of a computer-implemented method for video stabilization in embodiments according to the present disclosure.
Figure 10:
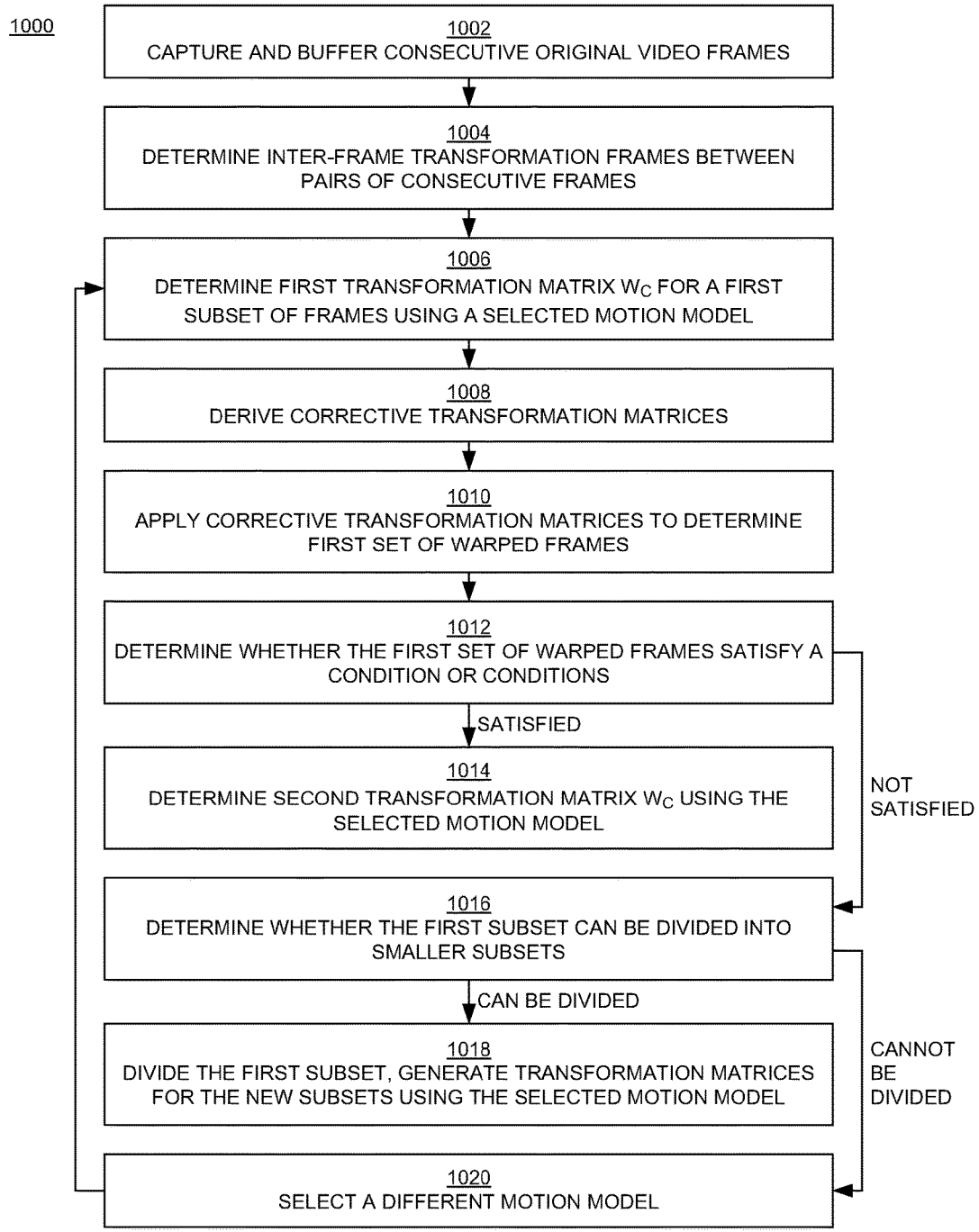
FIG. 10 is a flowchart of an example of a computer-implemented method for video stabilization in embodiments according to the present disclosure.

FIGS. 9 and 10 are flowcharts 900 and 1000, respectively, of examples of computer-implemented methods for video stabilization in embodiments according to the present disclosure. The operations of the flowcharts 900 and 1000 can be implemented by the device 1200 of FIG. 12. For example, the operations of the flowcharts 900 and 1000 can be implemented as computer-executable instructions residing on some form of non-transitory computer-readable storage medium (e.g., the memory 1204 of FIG. 12) and executed by a processor (e.g., the processor 1202 of FIG. 12).

In block 902 of FIG. 9, a buffer is maintained during video capture. The buffer contains a set of original frames. The buffer may be a backward-looking buffer or a forward-looking buffer. Alternatively, both a backward-looking buffer and a forward-looking buffer may be used.

In block 904, a set of inter-frame motion models is used to obtain an original camera trajectory over the buffered frames. In one embodiment, a set of keypoints in the original frames is extracted, the keypoints' correspondences between consecutive frames are computed, and a motion transformation matrix between consecutive frames is computed.

In block 906, real-time localized camera path planning is performed to remove unintended uttering and shakiness from the original camera trajectory. In one embodiment, a tree-splitting mechanism is used to find a piecewise stable camera trajectory over the buffered frames, and a piece of stable camera trajectory is computed based on cinematographic rules. In one such embodiment, the tree-splitting mechanism uses a constraint for the out-of-bound area size and a constraint for the skewness of the warped frame to determine the split location. In another such embodiment, the segment of stable camera trajectory is computed by computing the segment of stable camera trajectory that mimics a static camera or a camera moving (e.g., panning or zooming) with constant velocity.

In block 908, a camera trajectory is computed using an auto-corrective hybrid model. In one embodiment, the auto-corrective hybrid model includes a mechanism for automatically determining an appropriate motion model for the segment of stable camera trajectory. In one such embodiment, the appropriate motion model is selected from the group consisting of: a homography, an affine transformation, and a similarity transformation. In another such embodiment, the mechanism for automatically determining an appropriate motion model includes an approach of intelligently reducing the DOF of the motion model based on a robustness test. The robustness test may include testing whether the segments of camera trajectories satisfy the constraint for the out-of-bound area size and the constraint for the skewness of the warped frame as discussed above.

In block 910, a transitional camera trajectory is computed between consecutive buffers. In one embodiment, the transitional camera trajectory is computed by determining the position and length of the transition boundary, and computing the transitional camera trajectory using the auto-corrective hybrid model.

In block 912, a set of stabilized frames is synthesized using the set of original frames according to the computed camera trajectory.

In block 1002 of FIG. 10, a sliding window of consecutive original video frames that are captured using a camera is buffered.

In block 1004, inter-frame transformation matrices $\{W^{i,i+1}\}$ between pairs of consecutive frames in the first subset of the video frames are determined. The first subset may include all the frames in the sliding window, or a portion of those frames.

In block 1006, a first transformation matrix $W_c$ for the first subset of the subsets is generated (Eq. (6)) using a selected motion model (which may also be referred to herein as the first motion model). In an embodiment, the motion model is selected from a number of motion models including a homography model with eight degrees-of-freedom, an affine transformation model with five degrees-of-freedom, and a similarity transformation model with four degrees-of-freedom.

In block 1008, corrective transformation matrices {Bi} that change the inter-frame transformation matrices to match the first transformation matrix are derived.

In block 1010, the corrective transformation matrices are applied to the original video frames $x_i$ in the first subset to determine the first set of warped video frames $y_i$.

In block 1012, a determination is made as to whether the first set of warped video frames satisfies one or more conditions. The conditions include a constraint for out-of-bound area size and a constraint for amount of skewness of a warped video frame.

In block 1014, if the first set of warped video frames satisfies the condition(s), then a second transformation matrix $W_c$ for a second subset of the subsets is generated using the selected motion model; however, if the first set of warped video frames does not satisfy the condition(s), then a determination is made as to whether the first subset can be divided into smaller subsets (block 1016).

In block 1018, if the first subset can be divided into smaller subsets, then it is divided into a second subset and a third subset, second and third transformation matrices are generated for the second and third subsets, respectively, using the selected motion model, and the second and third transformation matrices are used to determine sets of warped video frames from original video frames in the second and third subsets, respectively.

If, on the other hand, the first subset cannot be divided into smaller subsets, then a second (e.g., different and less complex) motion model is selected (block 1020), a second transformation matrix for the first subset is generated using the second motion model, and the second transformation matrix may be used to determine the first set of warped video frames.

More specifically, if the second motion model is selected because the current (e.g., first) subset of video frames cannot be further divided, then blocks 1006, 1008, 1010, 1012, 1014, and 1018 are repeated using the second motion model in place of the first motion model. If, at block 1018, after application of the second motion model, the current subset cannot be further divided, then blocks 1006, 1008, 1010, 1012, 1014, and 1018 may be repeated using a third motion model in place of the second motion model.

As mentioned above, the motion models may include a homography model with eight degrees-of-freedom, an affine transformation model with five degrees-of-freedom, and a similarity transformation model with four degrees-of-freedom. In the flowchart 1100, the first motion model may refer to the homography model, in which case the second motion model may be the affine transformation model or the similarity transformation model; or the first motion model may refer to the affine transformation model, in which case the second motion model may refer to the similarity transformation model.

To summarize, in the present embodiments just described, path planning is localized over buffered segments for real-time streaming instead of over the whole camera trajectory, and multiple motion models for general stabilization, where the system automatically switches models adaptively according to the actual videos, are used instead of using the similarity model for general stabilization and using homographies only in transition areas to alleviate misalignments.

The main computational cost of the methodology disclosed herein lies in feature tracking and frame synthesis. Camera path planning is generally quite fast, since the computation is only over transformation matrices and point coordinates, which does not involve actual video frames.

In summary, according to the embodiments just described, auto-corrective hybrid model stabilization and localized camera path planning are introduced. By automatically switching among different motion models according to the actual video, the disclosed invention can adaptively choose the optimal motion models to use and therefore can improve stabilization results as well as reduce unpleasant artifacts. By maintaining a backward-looking buffer and performing localized camera path planning over the buffered video sequence, the disclosed invention provides one-pass real-time video stabilization ability, which both follows cinematographic rules to generate visually pleasant results and has low complexity in order to be easily implemented on mobile devices and the like. This is different from conventional two-pass stabilizers and conventional one-pass motion filtering approaches.

One-Pass Video Stabilization—Warping Frames by Global Motion Models

In embodiments about to be described, the GME module 110 (FIG. 1) receives or accesses shaky video frames, estimates the camera motion ("global motion") between two consecutive frames, and outputs a model that describes the motion. In an embodiment, the GME module 110 consists of two sub-steps: (1) global motion estimation; and (2) motion parameter estimation.

In the global motion estimation sub-step, block-based motion estimation (ME) is used to estimate a motion vector V(x, y) for each individual block inside a frame. To reduce complexity, a diamond-search (DS-based) ME process is applied to 16×16 non-overlapping blocks by default. However, both the size of the blocks and the overlapping amount can be adjusted to other values. To further control complexity, when an input video has a large resolution and/or high frame rate, each frame can be down-sampled prior to ME without much compromise on performance. For example, a 720p/30 frames per second video can be down-sampled by half in the spatial dimension.

In contrast to conventional DS-based ME procedures used in video compression, in this sub-step, the objective is to determine "true" motion vectors (MVs) instead of "best" MVs in the rate-distortion sense. Therefore, during ME, some blocks are intentionally skipped where true motions are difficult to estimate. In particular, a screening process is added before the DS-based ME to exclude those blocks that are relatively flat, e.g., have low texture variations. The screening process can improve the consistency of the estimated motion fields.

To further reduce complexity, it is possible for the stabilizer to share the ME process if there exists an appropriate video encoder. For example, an x264 encoder may perform a quick 16×16 look-ahead ME to have a rough estimate of the motion statistics of incoming video frames in its pre-analysis stage. Accordingly, it is possible for the stabilizer to share the outcome of the x264's pre-analysis ME.

In the motion parameter estimation sub-step in GME, a motion model is estimated for each motion field constructed by the DS-based ME. The estimated motion model captures how a frame moves due to camera motion relative to its reference frame. In one or more embodiments, it may be possible to exclude possible interference of "local" motions from foreground objects in this step. To that end, a RANSAC robust estimator is used. RANSAC iteratively samples a set of coordinate pairs from a frame pair and offset by its corresponding MV. The estimator then tries to estimate the best coefficients for a designated motion model by solving a set of linear equations. In the process, MV outliers caused by local motions or imperfect ME can be automatically suppressed by RANSAC.

In one or more embodiments, a geometric model with four parameters is used to describe how the camera moves. Four parameters are adequate to capture most types of motions caused by a shaky camera, and also to avoid extra fitting overhead and possibly ill-conditions associated with higher-order models. Other models can be readily adopted within the framework of a stabilizer according to the present embodiments.

The derived geometric model takes the following form to map coordinate (x, y) to coordinate (x', y'):

$$\begin{bmatrix} x' \\ y' \end{bmatrix} = \begin{bmatrix} a & -b \\ b & a \end{bmatrix}\begin{bmatrix} x \\ y \end{bmatrix} + \begin{bmatrix} c \\ d \end{bmatrix} = r \cdot \begin{bmatrix} \cos\theta & -\sin\theta \\ \sin\theta & \cos\theta \end{bmatrix}\begin{bmatrix} x \\ y \end{bmatrix} + \begin{bmatrix} c \\ d \end{bmatrix}. \quad \text{Eq. (8)}$$

where a, b, c, and d are the model parameters, $r=\sqrt{a^2+b^2}$, and $\theta=\tan^{-1}(b/a)$. In its transformed form in the second half of Eq. (8), the parameters r and θ represent the camera zooming and rotation effects, respectively. The parameters c and d correspond to horizontal and vertical movements of the camera. Therefore, camera jitters due to zooming, rotation and translations can be captured and stabilized.

The motion filtering receives or accesses motion statistics of the shaky video from GME, applies certain filtering operations to remove (or reduce) undesirable camera jitteriness, and outputs a smoothed motion trajectory.

Camera shakiness to be removed is generally characterized as short-term motion, and thus corresponds to the high-frequency components of a camera motion trajectory. By contrast, intentional camera motions (such as panning, zooming, etc.) are regarded as long-term motion and correspond to the low-frequency portion. A goal of motion filtering is to eliminate high-frequency components but preserve low-frequency ones, effectively achieving the effect of filtering the motion trajectory with a low-pass filter.

In the present embodiments, a novel approach to motion filtering is taken. Denote $M_i$ as the motion model that describes the relative global motion between video frame $f_{i-1}$ and $f_i$:

$$\begin{bmatrix} x_{i-1} \\ y_{i-1} \\ 1 \end{bmatrix} = M_i \begin{bmatrix} x_i \\ y_i \\ 1 \end{bmatrix} = \begin{bmatrix} a & -b & c \\ b & a & d \\ 0 & 0 & 1 \end{bmatrix} \cdot \begin{bmatrix} x_i \\ y_i \\ 1 \end{bmatrix} \quad \text{Eq. (9)}$$

where $(x_i, y_i)$ is an arbitrary pixel coordinate from frame $f_i$ and is mapped to pixel $(x_{i-1}, y_{i-1})$ in frame $f_{i-1}$ by $M_i$. In the second half of Eq. (9), the geometric model of $M_i$ is assumed to be as in Eq. (8). In an embodiment, all the coefficients of $M_i$ are obtained from the previous GME step.

Furthermore, denote $\tilde{M}_i^j$ as the accumulated motion between frames, defined as:

$$\tilde{M}_i^j = M_i \cdot M_{i+1} \ldots M_j = \Pi_{k=i}^{j} M_k. \quad \text{Eq. (10)}$$

$\tilde{M}_i^j$ then describes the relative global motion between frames $f_i$ and $f_j$ ($i<j$). Apply $\tilde{M}_i^j$ to $f_j$:

$$\hat{f}_j = \tilde{M}_i^j(f_j). \quad \text{Eq. (11)}$$

In Eq. (11), every pixel coordinate from $f_j$ is mapped by $\tilde{M}_i^j$ as in Eq. (9), the resulting transformed frame $\hat{f}_j$ will be temporally aligned with $f_i$, so that the relative global motion due to camera motion between the two frames is eliminated.

Eq. (11) can be repeatedly applied to any input frame $f_j$ (with $f_i$ set to be the first frame $f_0$ of the video) to obtain a stabilized video. However, this may not be possible if, for example, there is any long-term intentional camera motion in the video, since the intentional camera motion may be accumulated by $\tilde{M}_i^j$ and cause transformed frames to "drift" gradually, even eventually out of the frame boundary. Here, "drift" is referred to in a general sense in that it includes not only translational moves, but also zooming in/out and rotations.

As previously described, FIGS. 3A and 3B show a pair of frames taken from the middle of a video that has a consistent camera panning to the right; FIG. 3A is the original frame, and FIG. 3B is the transformed frame according to Eqs. (10) and (11). As depicted, the right frame's content is shifted to the right due to the accumulated panning motion, thus leaving an area of the frame with unfilled black pixels.

The present embodiments according to the invention provide a mechanism to counter the drift effect. In one or more embodiments, a mechanism is provided to detect and then compensate a long-term, consistent motion. In an embodiment, an observation window is associated with each frame, as shown in FIG. 2 previously described herein, from which the motion characteristics in a period can be determined. In FIG. 2, the current frame in the stabilization process is frame i and the observation window can include preceding frames ("look-ahead") or following frames ("look-back") in temporal order.

To detect drift, it is assumed that, for a long-term camera motion, the accumulated motion in the observation window should be more substantial compared to any short-term random camera motion that also might occur in the same window, as long as the window size is large enough.

For example, using the look-ahead window in FIG. 2 to detect a long-term camera motion at frame i, all the motion models $M_{i+1}, M_{i+2}, \ldots, M_{i+k}$ in the look-ahead window are accumulated in the variable $\tilde{M}_{i+1}^{i+k}$ and its geometric mean $\overline{M}$ is calculated:

$$\tilde{M}_{i+1}^{i+k} = M_{i+1} \cdot M_{i+2} \cdot \ldots \cdot M_{i+k} = (\overline{M})^k. \quad \text{Eq. (12)}$$

If $\tilde{M}_{i+1}^{i+k}$ is significant, so is $\overline{M}$. Hence, $\overline{M}$ is tested against a set of thresholds:

$$r(\overline{M}) < r_{low} \text{ or } r(\overline{M}) > r_{high}$$

$$|\theta(\overline{M})| > \theta_{thresh} \text{ or } |c(\overline{M})| > c_{thresh} \text{ or } |d(\overline{M})| > d_{thresh} \quad \text{Eq. (13)}$$

where $r(\overline{M})$, $\theta(\overline{M})$, $c(\overline{M})$, and $d(\overline{M})$ follow their respective definitions in Eq. (8) (but in terms of $\overline{M}$) and the right-side variables in the above inequalities are predefined threshold values.

If M passes any of the tests, a long-term, consistent camera motion is declared. When a long-term camera motion detected, as the next step, its effect is removed from the accumulation process. As the geometric mean, $\overline{M}$ represents a smoothed, averaged version of the long-term motions occurring in the observation window. The long-term effect is negated from the current motion model $M_i$ by:

$$r(M_i) = r(M_i/\overline{M}), \theta(M_i) = \theta(M_1) - \theta(\overline{M}), c(M_1) = c(M_i) - c(\overline{M}) d(M_i) = d(M_i) - d(\overline{M}). \quad \text{Eq. (14)}$$

After application of Eq. (14), the adjusted $M_i$ is accumulated in $\tilde{M}_i$ that later warps frame $f_i$.

From the above steps, if the threshold values in Eq. (13) are set too loose (or large) compared to the real motion experienced by the camera, some long-term motions with small magnitudes may fail to be detected and thus get accumulated in $\tilde{M}_i^j$. These motions can gradually cause stabilized frames to drift and leave more areas in black pixels. On the other hand, if these values are set too restrictive (or small), the current motion model $M_i$ may get adjusted by non-zero accumulated camera body disturbance, which may lead to a less stabilized video. In practice, these threshold values can be automatically adapted according to detected camera motions. For example, when the modeled motion parameters in Eq. (8) consistently exceed the set of threshold values in Eq. (13), those values can be adjusted upwards, and vice versa.

In Eq. (12), there is an observation window that stores a number of motion models to detect long-term camera motions. The window can be set to store models from either future or past frames (relative to the current video frame). When storing the future models, any long-term motion can be learned in advance before it gets accumulated in $\tilde{M}_{i+1}^{i+k}$ so it generally produces smaller unfilled areas. In one or more embodiments, past models may be stored. According to these embodiments, a stabilized video frame in sync with the input frame that does not require extra frame storage can be output.

In one or more of the present embodiments, the frame synthesizer module receives or accesses smoothed motion models from motion filtering and applies them to warp the corresponding original video frames, and outputs stabilized (and possibly further processed) video frames.

There may still exist residual drifts in the process that cause black boundaries around frames of a stabilized video. An optional trimming step can be applied to remove them. To do that, the stabilizer according to the present embodiments can record the largest trimming ratio of all the transformed frames. Meanwhile, the stabilizer also stores each stabilized frame. Once the normal stabilization is done, the stored video file is rescanned and unfilled regions are cropped away.

Figure 11:
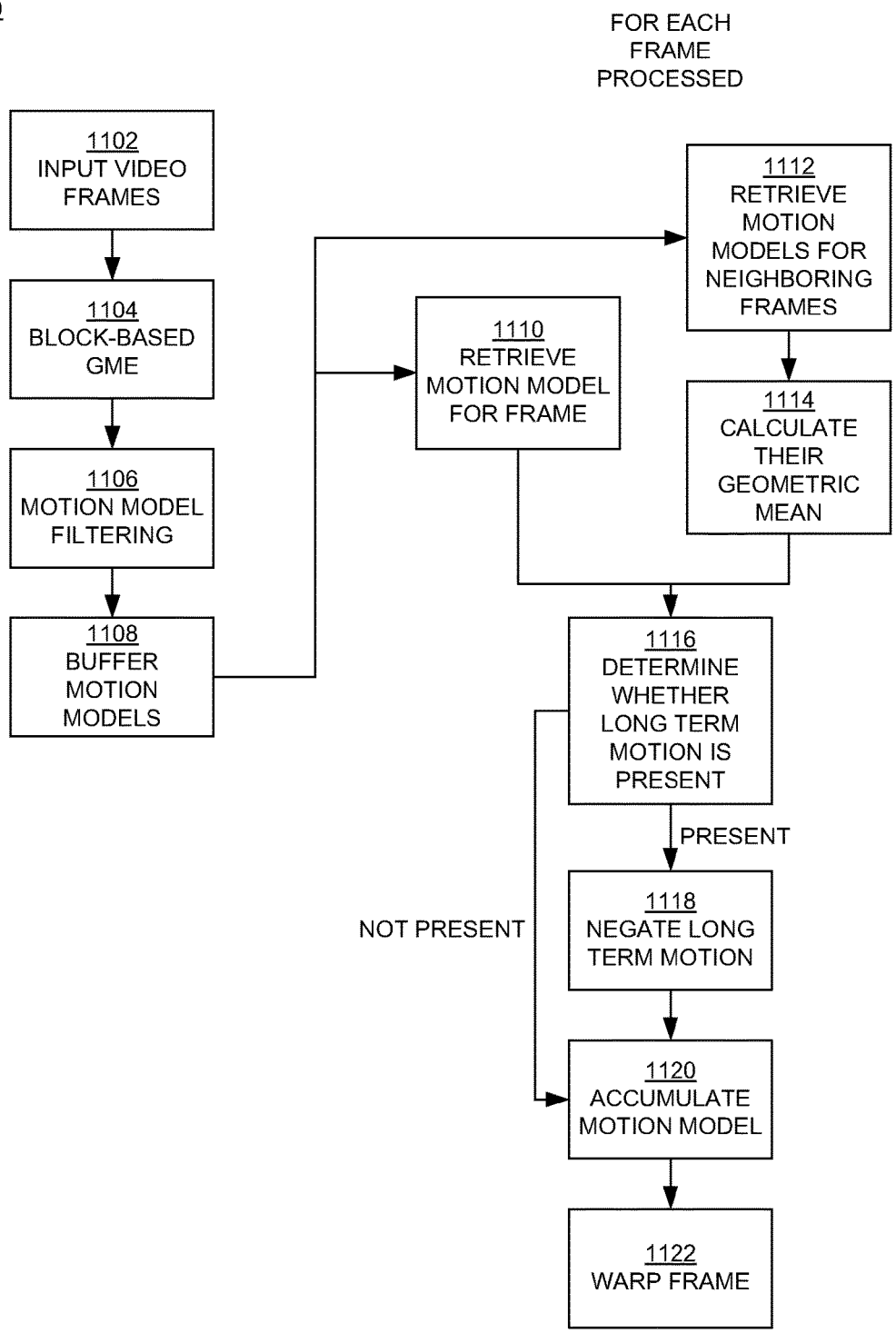
FIG. 11 is a flowchart of an example of a computer-implemented method for video stabilization in embodiments according to the present disclosure.

A flowchart 1100 of a method of video stabilization according to the present embodiments is shown in FIG. 11. The operations of the flowchart 1100 can be implemented by the device 1200 of FIG. 12. For example, the operations of the flowchart 1100 can be implemented as computer-executable instructions residing on some form of non-transitory computer-readable storage medium (e.g., the memory 1204 of FIG. 12) and executed by a processor (e.g., the processor 1202 of FIG. 12).

In block 1102 of FIG. 11, input video frames are accessed. In block 1104, a block-based GME model is estimated, to estimate a motion vector for each individual block inside a frame. In block 1106, motion modeling filtering is performed using, for example, a RANSAC estimator, to suppress motion vector outliers or imperfect motion estimation. In block 1108, a motion model that describes the relative global motion between two consecutive frames is produced (Eqs. (9), (10), (11)), and those motion models are stored (e.g., buffered) in memory.

The following blocks in the flowchart 1100 are performed for each frame to be processed. In block 1110, the motion model for the frame being processed is retrieved from memory. In block 1112, the motion models for neighboring frames are retrieved from memory. In block 1114, the geometric mean of the motion models for the neighboring frames is calculated (Eq. (12)).

In block 1116, using the geometric mean of block 1114, a determination is made with regard to whether there is long-term motion present (Eq. (13)). If not, then the flowchart 1100 proceeds to block 1120. If so, then the flowchart 1100 proceeds to block 1118. In block 1118, the long-term motion is negated from the motion model for the frame being processed (Eq. (14)).

In block 1120, the motion model for the frame being processed is accumulated in $\tilde{M}_t$. In block 1122, $\tilde{M}_t$ is used to warp the frame currently being processed.

Figure 12:
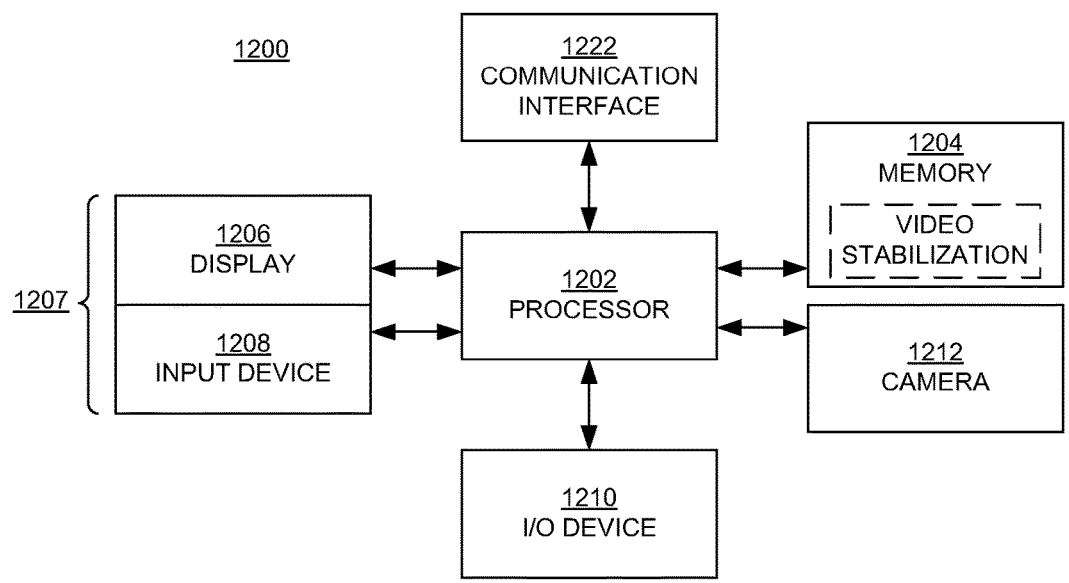
FIG. 12 is a block diagram of an example of a device capable of implementing embodiments according to the present disclosure.

FIG. 12 is a block diagram of an example of a device 1200 capable of implementing embodiments according to the present invention. The device 1200 broadly represents any single or multi-processor computing device or system capable of executing computer-readable instructions. The device 1200 can be used to implement the video stabilization functionality disclosed herein. Depending on the implementation, the device 1200 may not include all of the elements shown in FIG. 12, and/or it may include elements in addition to those shown in FIG. 12. The device 1200 may be a mobile device, such as but not limited to a smartphone, tablet, or wearable device such as glasses and a watch.

In its most basic configuration, the device 1200 may include at least one processor 1202 (CPU) and at least one memory 1204. The processor 1202 generally represents any type or form of processing unit capable of processing data or interpreting and executing instructions. In certain embodiments, the processor 1202 may receive instructions from a software application or module (e.g., the video stabilization application/module) stored in a memory (e.g., the memory 1204). These instructions may cause the processor 1202 to perform the functions of one or more of the example embodiments described and/or illustrated herein.

The memory 1204 generally represents any type or form of volatile or non-volatile storage device or medium capable of storing data and/or other computer-readable instructions (e.g., a video stabilization application/module). In certain embodiments the device 1200 may include both a volatile memory unit (such as, for example, the memory 1204) and a non-volatile storage device (not shown).

The device 1200 may include a display device 1206 that is operatively coupled to the processor 1202. The display device 1206 is generally configured to display a graphical user interface (GUI) that provides an easy to use interface between a user and the device.

The device 1200 may also include an input device 1208 that is operatively coupled to the processor 1202. The input device 1208 may include a touch sensing device (a touch screen) configured to receive input from a user's touch and to send this information to the processor 1202. The input device 1208 may be integrated with the display device 1206 or they may be separate components. The input device 1208 and display device 1206 may be collectively referred to herein as a touch screen display 1207.

The device 1200 may also include a camera 1212 that can be used to capture single images and video sequences.

The device 1200 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into the device 1200. All or a portion of the computer program stored on the computer-readable medium may then be stored in the memory 1204. When executed by the processor 1202, a computer program loaded into the device 1200 may cause the processor 1202 to perform and/or be a means for performing the functions of the example embodiments described and/or illustrated herein. Additionally or alternatively, the example embodiments described and/or illustrated herein may be implemented in firmware and/or hardware.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosed invention.

Embodiments according to the invention are thus described. While the present disclosure has been described in particular embodiments, it should be appreciated that the invention should not be construed as limited by such embodiments, but rather construed according to the below claims.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A device configured to provide one-pass, real-time video stabilization, comprising:
a memory including a buffer and instructions; and
a processor coupled to the memory, the processor configured to execute the instructions stored in the memory to cause the processor to:
store consecutive video frames in the buffer of the memory after receipt, the consecutive video frames including a current video frame and a plurality of previous video frames;
estimate a global motion for the current video frame based on a relative motion of a camera between the current video frame and one of the previous video frames adjacent to the current video frame;
determine a geometric mean of the estimated global motion for the current video frame and a plurality of estimated global motions for each of the previous video frames within a predetermined duration of time;
estimate a long-term camera motion for the current video frame based on the geometric mean of the estimated global motion for the current video frame and the estimated global motions for each of the previous video frames within the predetermined duration of time; and
stabilize the current video frame based on the estimated long-term camera motion; and
a display device coupled to the processor, the display device configured to display the current video frame as stabilized.

2. The device of claim 1, wherein the instructions when executed further cause the processor to apply a Kalman filter to smooth the estimated long-term camera motion.

3. The device of claim 2, wherein the estimated global motion for the current video frame comprises a first transformation matrix, the estimated long-term camera motion for the current video frame comprises a second transformation matrix, and the smoothed estimated long-term camera motion is a third transformation matrix.

4. The device of claim 3, wherein the first transformation matrix, the second transformation matrix, and the third transformation matrix each comprise a N×N matrix.

5. The device of claim 1, wherein the current video frame is warped prior to being displayed.

6. The device of claim 5, wherein the instructions when executed further cause the processor to, prior to warping the current video frame, adjust the estimated long-term camera motion according to the formula:
wherein c is a coefficient of the estimated long-term camera motion and F is a forgetting factor between 0 and 1.

7. The device of claim 1, wherein the instructions when executed further cause the processor to:
match a plurality of feature points between the current video frame and the one of the previous video frames adjacent to the current video frame;
calculate a ratio between a number of inlier feature points and a total number of feature points; and
determine a process noise covariance parameter and a measurement noise covariance parameter using the ratio, the process noise covariance parameter and the measurement noise covariance parameter used by a Kalman filter to control a relative weight between an a priori estimation and a measurement value in an a posteriori estimation.

8. The device of claim 1, wherein the instructions when executed further cause the processor to adjust a number of video frames in a subset of the consecutive video frames in response to one or more of an input from a sensor on the device, an input from a user, and information indicating how the device is being used.

9. The device of claim 1, wherein the buffer comprises one of a window buffer, a backward-looking buffer, and a forward-looking buffer.

10. A method of stabilizing a video in real time using a single pass, comprising:
receiving consecutive video frames, the consecutive video frames including a current video frame and a plurality of previous video frames;
storing the consecutive video frames in a buffer;
estimating a global motion for the current video frame based on a relative motion of a camera between the current video frame and one of the previous video frames adjacent to the current video frame;
determining a geometric mean of the estimated global motion for the current video frame and a plurality of estimated global motions for each of the previous video frames within a predetermined duration of time;
estimating a long-term camera motion for the current video frame based on the geometric mean of the estimated global motion for the current video frame and the estimated global motions for each of the previous video frames within the predetermined duration of time; and
displaying the current video frame on a display of an electronic device, the current video frame stabilized based on the estimated long-term camera motion.

11. The method of claim 10, further comprising applying a Kalman filter to the estimated long-term camera motion to smooth the estimated long-term camera motion.

12. The method of claim 11, wherein the estimated global motion for the current video frame comprises a first transformation matrix, the estimated long-term camera motion for the current video frame comprises a second transformation matrix, and the smoothed estimated long-term camera motion is a third transformation matrix.

13. The method of claim 12, wherein the first transformation matrix, the second transformation matrix, and the third transformation matrix each comprise a N×N matrix.

14. The method of claim 10, further comprising warping the current video frame according to the estimated long-term camera motion for the current video frame.

15. The method of claim 14, wherein, prior to warping the current video frame, the method further comprises adjusting the estimated long-term camera motion according to the formula:
wherein c is a coefficient of the estimated long-term camera motion and F is a forgetting factor between 0 and 1.

16. The method of claim 10, further comprising matching a plurality of feature points between the current video frame and the one of the previous video frames adjacent to the current video frame;
calculating a ratio between a number of inlier feature points and a total number of the plurality of feature points; and
determining a process noise covariance parameter and a measurement noise covariance parameter with the ratio, the process noise covariance parameter and the measurement noise covariance parameter used by a Kalman filter to control a relative weight between an a priori estimation and a measurement value in an a posteriori estimation.

17. The method of claim 13, wherein the buffer comprises a window buffer.

18. The method of claim 13, wherein the buffer comprises one of a backward-looking buffer and a forward-looking buffer.

19. A computer program product comprising computer executable instructions stored on a non-transitory medium that when executed by a processor cause a one-pass, real-time video stabilization device to:
receive consecutive video frames, the consecutive video frames including a current video frame and a plurality of previous video frames;
store the consecutive video frames in a buffer;
estimate a global motion for the current video based on a relative motion of a camera between the current video frame and one of the previous video frames adjacent to the current video frame;
determine a geometric mean of the estimated global motion for the current video frame and a plurality of estimated global motions for each of the previous video frames within a predetermined duration of time;
estimate a long-term camera motion for the current video frame based on the geometric mean of the estimated global motion for the current video frame and the estimated global motions for each of the previous video frames within the predetermined duration of time; and
display the current video frame on a display of an electronic device, the current video frame stabilized based on the estimated long-term camera motion.

20. The computer program product of claim 19, wherein the estimated global motion for the current video frame comprises a first transformation matrix, the estimated long-term camera motion for the current video frame comprises a second transformation matrix, and a smoothed estimated long-term camera motion is a third transformation matrix, and wherein the buffer comprises one of a window buffer, a backward-looking buffer, and a forward-looking buffer.

* * * * *

UNITED STATES PATENT AND TRADEMARK OFFICE
CERTIFICATE OF CORRECTION

PATENT NO. : 10,404,917 B2
APPLICATION NO. : 15/783603
DATED : September 3, 2019
INVENTOR(S) : Zhenyu Wu et al.

It is certified that error appears in the above-identified patent and that said Letters Patent is hereby corrected as shown below:

In the Claims

Column 21, Lines 50-56, Claim 6, should read:
6. The device of claim 5, wherein the instructions when executed further cause the processor to, prior to warping the current video frame, adjust the estimated long-term camera motion according to the formula:
$$c=(1-F)\times c$$
wherein c is a coefficient of the estimated long-term camera motion and F is a forgetting factor between 0 and 1.

Column 22, Lines 51-57, Claim 15, should read:
15. The method of claim 14, wherein, prior to warping the current video frame, the method further comprises adjusting the estimated long-term camera motion according to the formula:
$$c=(1-F)\times c$$
wherein c is a coefficient of the estimated long-term camera motion and F is a forgetting factor between 0 and 1.

Signed and Sealed this
Twenty-ninth Day of October, 2019

Andrei Iancu
*Director of the United States Patent and Trademark Office*